RECTIFIER

Filed May 25, 1953

INVENTOR.
Roland W. Smith

BY J. L. Whittaker
ATTORNEY

United States Patent Office 2,854,611

Patented Sept. 30, 1958

2,854,611

RECTIFIER

Roland W. Smith, Princeton, N. J., assignor to Radio Corporation of America, a corporation of Delaware Application May 25, 1953, Serial No. 357,179

10 Claims. (Cl. 317—237)

This invention relates to electric current rectifiers and more particularly to broad area rectifiers utilizing solid rectifying elements.

Broad area rectifiers are well known in the electrical and radio arts. Some of the better-known types utilize selenium, copper oxide or copper sulphide mounted between two dissimilar metallic electrodes. While broad area rectifiers that are presently in use have a multitude of applications, they are sometimes inefficient in operation and unstable as to their electrical characteristics. They frequently require complicated and carefully controlled processes of manufacture which make them expensive to produce as well as to operate.

It is an object of this invention to provide a new and improved electric current rectifier of the broad area type.

Another object of this invention is to provide an electric current rectifier that is light in weight and efficient in operation.

A further object of this invention is to provide an electric current rectifier that can be manufactured easily and cheaply.

An object of this invention is to provide an electric current rectifier with a high front-to-back current-ratio.

Another object of this invention is to provide an improved method of making electric current rectifiers.

One feature of this invention comprises the use of an ohmic electrode composed of a metal or an alloy of metals containing at least 50% of at least one metal, selected from the group consisting of indium, gallium, thallium, cerium, magnesium, tin and lead, to obtain an ohmic contact; and a rectifying electrode composed of a metal or an alloy of metals, said electrodes being in broad area contact with a body of material having N-type conductivity.

Another feature of this invention comprises the use of cadmium sulphide as the N-type material in a broad area rectifier. A third feature of this invention comprises the use of cadmium solenide as the N-type material in a broad area rectifier.

The method of this invention comprises forming a broad area ohmic contact and a broad area rectifying contact to a body of an N-type material, said contacts being in surface contact with said N-type body.

The novel features of the invention, both as to its organization as well as additional advantages thereof, will be set forth in greater detail in the following detailed description in conjunction with the accompanying drawings in which.

In general, the principle involved in this invention is to provide an ohmic electric contact and a non-ohmic contact to a body of N-type material. An ohmic contact, as used in this application, refers to a contact that appears free of barriers and barrier effects, and freely supplies a large reservoir of electrons to the body of N-type material. A non-ohmic contact, as used in this application, refers to a contact that has a barrier layer at the contact interface and offers a higher resistance to current flow in one direction through the barrier than in the opposite direction. This results in an asymmetric current-voltage characteristic through the non-ohmic contact as well as through the whole element. In one direction of current flow, relatively large currents flow when relatively small potentials are applied. This is the forward direction of current flow. In the opposite direction of current flow, very small currents pass, even when relatively large voltages are applied. This is the back direction of current flow.

In this application, the electrode which makes the ohmic contact is referred to as the ohmic electrode, and the electrode which makes the rectifying contact is referred to as the rectifying electrode.

Rectifying contacts and methods of making them are quite well known in the radio and electrical arts. Indeed, they represent the ordinary type electrode connected to an N-type material. For example, silver, gold, platinum, copper, nickel, zinc or cadmium electrodes connected to an N-type material by any of the ordinary processes, yields a rectifying contact.

Ohmic contacts and methods of making them are not well known nor are such contacts easily made. This invention utilizes the contacts and methods described by R. W. Smith and A. Rose in their joint application, Serial No. 352,298, filed April 30, 1953.

*Example 1*

Figure 1:
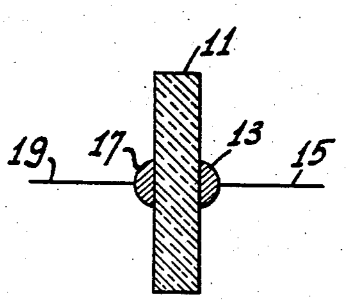
Figure 1 is an elevational sectional view of a rectifier embodying the present invention.

Figure 1 illustrates a rectifier made according to the present invention. To prepare a rectifier by the method of this invention, a piece of indium metal is shaped into an electrode 17. This may be done by any of the commonly known methods, for example, casting, rolling, punching and stamping. A surface of the electrode 17 so formed is pressed against the surface of a cadmium sulphide crystal 11, so that the two surfaces are in intimate physical contact with each other. In order to facilitate physical contact between the surfaces, the electrode 17 may be warmed for a fraction of a minute in a non-oxidizing atmosphere. An ohmic contact is obtained when the electrode 17 is in intimate surface contact with the crystal 11. A drop of silver paste is suitably shaped and then pressed against the opposite side of crystal 11 to form the rectifying contact 13. Suitable lead wires 15 and 19 are attached by the usual methods.

Figure 2:
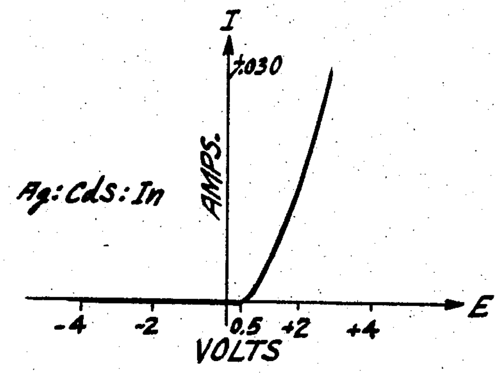
Figure 2 is an oscilloscope trace illustrating the current voltage characteristics of a rectifier made according to the present invention utilizing a single cadmium sulphide crystal, an indium electrode and a silver electrode.

Figure 2 illustrates the trace given by a rectifier prepared according to Example 1. Rectifiers of this type show a current flow in the forward direction of about one milliampere when one volt is applied to electrodes having a contact area of about one square millimeter. The forward direction of current flow is obtained when the silver electrode is positive and the indium electrode is negative. If the polarity is reversed, and one volt is applied to the contacts, the current in the back direction is about $10^{-7}$ milliamperes. This is a forward-to-back current-ratio of about $10^7$.

*Example 2*

Since indium melts at about 155° C., heating, as carried out in Example 1, often melts the indium and the indium forms a ball. To facilitate obtaining a good ohmic contact to a cadmium sulphide crystal, indium is coated on at least one side of a thin sheet of a soft metal, for example, nickel. The coated sheet is now formed into an ohmic electrode, and the coated surface of the resulting ohmic electrode applied to the surface of the cadmium sulphide crystal as described in Example 1. This procedure facilitates obtaining a good ohmic contact, as well as allowing the use of a cheaper metal to serve as a base for the more expensive indium without affecting the electrical properties of the contact. The rectifying contact is applied as described in Example 1.

Good ohmic contacts can be obtained by using electrodes composed of a metal or an alloy of metals selected from the class consisting of indium, gallium, thallium, tin, lead, magnesium and cerium. These metals are believed to have low work functions. Pure indium and pure gallium or alloys thereof are the preferred materials out of which to form the ohmic electrode. Since gallium melts at about 30° C. and indium melts at about 155° C., the electrodes made of these metals can be brought into intimate contact with the active material in the element with the very smallest amount of heat and pressure. Thallium, tin, lead, magnesium and cerium are good contact materials also but, since their melting points are higher than indium or gallium, they are more difficult to work with. One or more of the above-mentioned metals may be alloyed with other metals provided the other metals do not exceed about 50% of the composition. For example, good contacts result from mixtures of bismuth and indium, bismuth and gallium, mercury and indium or mercury and gallium. Alloys can be prepared by any of the well-known methods, for example, melting the constituents together to form a solution of metals.

The ohmic electrode may be shaped by any of the commonly known methods, for example, rolling, punching and stamping. The electrode in its simplest form is a single composition that has been suitably shaped. Alternatively, the electrode material may be coated on some other material that will serve as a base. For example, sheet nickel having a layer of indium or gallium on one or both sides and suitably shaped makes a good ohmic electrode. Similarly, sheet nickel having a layer of indium on one or both sides and then a layer of gallium upon the layer of indium, and suitably shaped, makes a good ohmic electrode.

After the ohmic electrode is formed, the surface of the electrode is applied to the surface of a body of N-type material. All that is necessary is that the two surfaces are in intimate physical contact with one another. If the electrode material is soft enough, merely placing the two surfaces against one another with the slightest pressure will effect a good ohmic contact. In other cases, pressure and heating are used to facilitate intimate physical contact between the surfaces. If heating is necessary, a non-oxidizing atmosphere will facilitate the operation. After the contact is made, the heat and pressure are removed. While heating may be used to obtain good contacts, it should be clear that it is used for the purpose of making intimate physical contact between electrode and body surfaces, and that it is not for the purpose of diffusing the electrode material into the body of the N-type material. It is believed that no diffusion takes place. When the electrode is removed from the body after a previous contact has been made, there is no sign of the previous contact nor does a subsequent contact prefer the previous contact area.

A good ohmic contact may also be obtained by forming an electrode directly on the body of N-type material by several well-known methods. For example, the electrode may be formed by evaporating, sputtering or spraying the electrode material on the body.

Good rectifying contacts can be obtained by using electrodes composed of a metal or alloy of metals selected from the class consisting of silver, gold, platinum, copper, cadmium, zinc and nickel. These metals are believed to have high work functions. One or more of these metals may be alloyed with other metals provided the other metals do not exceed about 50% of the composition. The rectifying electrode can be prepared and applied to the body of N-type material by any of the methods for preparing and applying the ohmic electrode. Both the ohmic and the rectifying electrodes may be applied to the N-type body simultaneously or one may be applied to the N-type body before the other.

Figure 3:
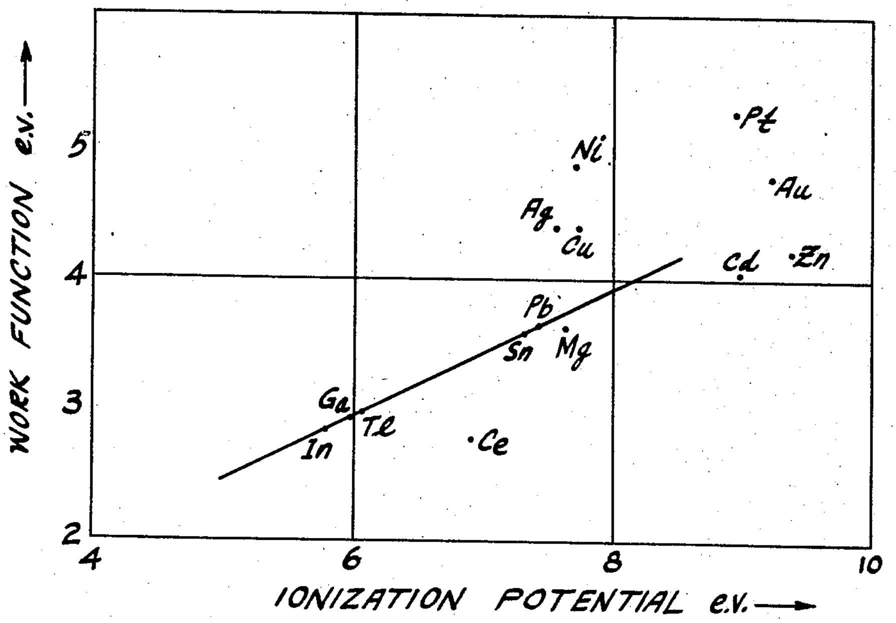
Figure 3 is a chart in which certain metals have been plotted according to their estimated work functions and ionization potentials.

Figure 3 is a chart in which certain metals have been plotted according to their estimated work functions and their ionization potentials, both measured in electron volts. It will be noted that the materials used to prepare the ohmic electrodes are believed to have both low work functions and low ionization potentials; and that the materials used to prepare the rectifying electrodes are believed to have both high work functions and high ionization potentials. In accordance with the present invention, it has been found that generally a low work-function metal or alloy of metals in contact with a body of N-type material forms an ohmic contact. Similarly, a high work-function metal or alloy of metals in contact with a body of N-type material generally forms a rectifying contact.

The material to which the electrodes attach may be a single crystal or a body of material or a layer of material. However, it must be a body of material that conducts electric currents by negatively charged carriers or electrons, as opposed to conduction by positively charged carriers or "holes." These materials may be insulators, semi-conductors or photoconductors depending on their resistivities and photosensitivities. They are designated as N-type in this application to indicate the nature of the current carriers. Cadmium sulphide is often classed as an insulator when its resistivity is greater than $10^{10}$ ohm-cm., as a semiconductor when its resistivity is less than $10^{10}$ ohm-cm., and also as a photoconductor when it is photosensitive. These three forms of cadmium sulphide illustrate an N-type insulator, an N-type semi-conductor and an N-type photoconductor from which rectifiers can be made by the method of this invention.

Conducting-type cadmium sulphide is the preferred material for use as a rectifier since it has a relatively low internal resistance to the flow of electric currents. However, broad area rectifiers can be made from the insulating type of cadmium sulphide or from the photosensitive type of cadmium sulphide. In the photosensitive variety, the electric current passing through the rectifier can be controlled both by the applied voltage and by the intensity of light with which the semiconductor is irradiated.

Examples of other materials from which broad area rectifiers can be made by the method of this invention are cadmium selenide and zinc oxide.

There has thus been described novel broad area rectifiers and methods for making them. Although specific embodiments of this invention have been described, it will be understood that they are but illustrative and that various modifications may be made therein without departing from the spirit and scope of this invention.

What is claimed is:

1. An electrical device comprising a body of N-type material selected from the class consisting of cadmium sulphide and cadmium selenide, a rectifying electrode in surface contact with said body, and an ohmic electrode in broad-area surface contact with said body, said ohmic electrode composed of a material selected from the class consisting of metals and alloys of metals and containing at least 50% of at least one metal selected from the class consisting of indium, gallium, thallium, tin, lead, magnesium and cerium.

2. The device of claim 1 wherein said N-type material is cadmium selenide.

3. The device of claim 1 wherein said N-type material is cadmium sulphide.

4. The device of claim 3 wherein said selected metal is indium.

5. The device of claim 3 wherein said selected metal is gallium.

6. An electrical device comprising a crystal of N-type material selected from the class consisting of cadmium sulphide and cadmium selenide, a rectifying electrode in surface contact with said body, and an ohmic electrode in broad-area surface contact with said body, said ohmic electrode composed of a material selected from the class consisting of metals and alloys of metals and containing at least 50% of at least one metal selected from the class consisting of indium, gallium, thallium, tin, lead, magnesium and cerium.

7. The device of claim 6 wherein said N-type material is cadmium selenide.

8. The device of claim 6 wherein said N-type material is cadmium sulphide.

9. The device of claim 8 wherein said selected metal is indium.

10. The device of claim 8 wherein said selected metal is gallium.

References Cited in the file of this patent

UNITED STATES PATENTS

| | | |
|---|---|---|
| 1,751,361 | Ruben | Mar. 18, 1930 |
| 2,208,455 | Glaser et al. | July 16, 1940 |
| 2,479,446 | Wilson | Aug. 16, 1949 |
| 2,541,832 | Quinn | Feb. 13, 1951 |
| 2,582,850 | Rose | Jan. 15, 1952 |
| 2,651,700 | Gans | Sept. 8, 1953 |

UNITED STATES PATENT OFFICE
CERTIFICATE OF CORRECTION

Patent No. 2,854,611 September 30, 1958

Roland W. Smith

It is hereby certified that error appears in the printed specification of the above numbered patent requiring correction and that the said Letters Patent should read as corrected below.

Column 1, line 53, for "solenide" read -- selenide --.

Signed and sealed this 16th day of December 1958.

(SEAL)

Attest:

KARL H. AXLINE
Attesting Officer

ROBERT C. WATSON
Commissioner of Patents